(12) United States Patent
Razon

(10) Patent No.: US 9,498,696 B1
(45) Date of Patent: Nov. 22, 2016

(54) BODY SUPPORT SYSTEM FOR GAIT TRAINING EXERCISE ON A TREADMILL

(71) Applicant: Eli Razon, Maple Glen, PA (US)

(72) Inventor: Eli Razon, Maple Glen, PA (US)

( * ) Notice: Subject to any disclaimer, the term of this patent is extended or adjusted under 35 U.S.C. 154(b) by 0 days.

(21) Appl. No.: 14/816,041

(22) Filed: Aug. 2, 2015

Related U.S. Application Data

(60) Provisional application No. 62/047,011, filed on Sep. 7, 2014.

(51) Int. Cl.
   *A63B 22/02* (2006.01)
   *A63B 71/00* (2006.01)
   *A63B 22/00* (2006.01)

(52) U.S. Cl.
   CPC ....... *A63B 71/0009* (2013.01); *A63B 22/0046* (2013.01); *A63B 22/02* (2013.01)

(58) Field of Classification Search
   CPC ................ A63B 22/02; A63B 22/0235; A63B 22/0285; A63B 23/0405; A63B 23/04; A63B 2208/0204; A63B 2208/0233; A63B 2225/093; A61H 3/04; A61H 3/00; A61H 2201/0161
   USPC .......................... 482/54, 69, 142; 135/66–67
   See application file for complete search history.

(56) References Cited

U.S. PATENT DOCUMENTS

| | | | | | |
|---|---|---|---|---|---|
| 2,991,485 | A | * | 7/1961 | Schulte | A61G 7/1017 5/83.1 |
| 4,211,426 | A | * | 7/1980 | Motloch | A47D 13/04 280/87.041 |
| 5,502,851 | A | * | 4/1996 | Costello | A61H 3/04 482/69 |
| 6,224,154 | B1 | * | 5/2001 | Stoki | A61B 90/60 297/338 |
| 6,689,075 | B2 | * | 2/2004 | West | A61F 5/0102 482/69 |
| 7,980,856 | B2 | * | 7/2011 | Grabiner | A63B 22/0235 434/258 |
| 8,147,436 | B2 | * | 4/2012 | Agrawal | A63B 21/00181 602/16 |
| 8,246,354 | B2 | * | 8/2012 | Chu | A63B 22/0292 434/258 |
| 8,323,156 | B2 | * | 12/2012 | Ozawa | A61H 1/003 482/142 |
| 8,460,162 | B2 | * | 6/2013 | Park | A61H 1/0262 482/1 |
| 8,480,602 | B1 | * | 7/2013 | Cook | A63B 69/0064 482/54 |
| 8,608,479 | B2 | * | 12/2013 | Liu | A61H 1/024 434/255 |
| 2010/0298102 | A1 | * | 11/2010 | Bosecker | A61H 1/005 482/54 |

(Continued)

*Primary Examiner* — Loan H Thanh
*Assistant Examiner* — Andrew S Lo

(57) ABSTRACT

A treadmill body support apparatus is provided to assist users in standing, walking and running on a treadmill surface and exercising safely on the treadmill surface with freedom of vertical and lateral gait movement. The treadmill body support apparatus can be used by disabled and impaired users that require movement of the user to and from the treadmill surface from a mobility aid such as a wheelchair and adjustable weight-bearing support and balance support while exercising safely on the treadmill surface with freedom of vertical and lateral gait movement.

14 Claims, 10 Drawing Sheets

(56) References Cited

U.S. PATENT DOCUMENTS

2012/0000496 A1* 1/2012 Razon ..................... A61H 3/04
135/67

* cited by examiner

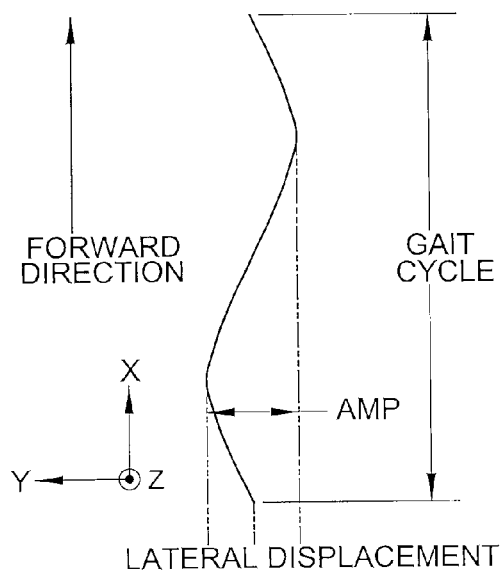
FIG. 1
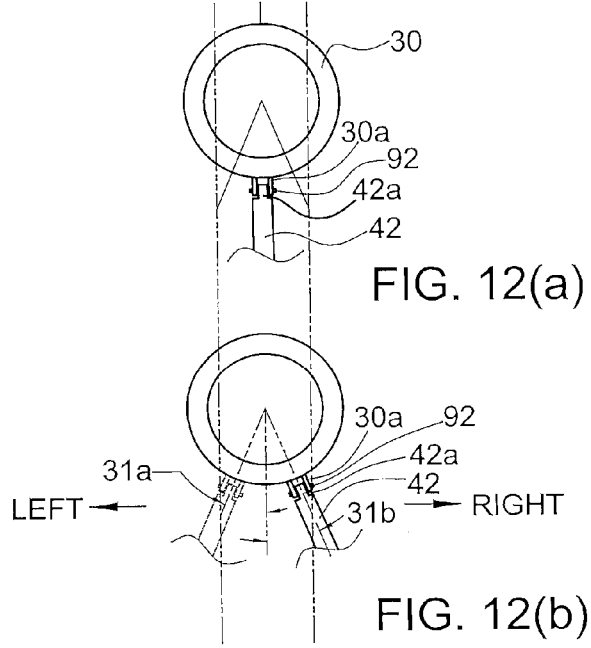
FIG. 12(a)
FIG. 12(b)
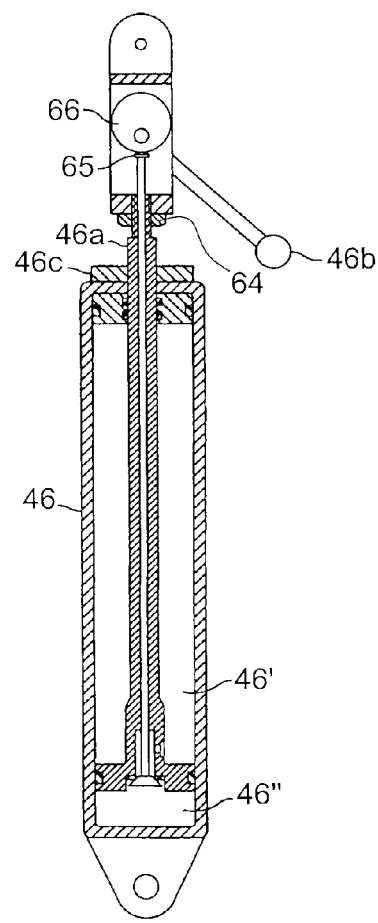
FIG. 11

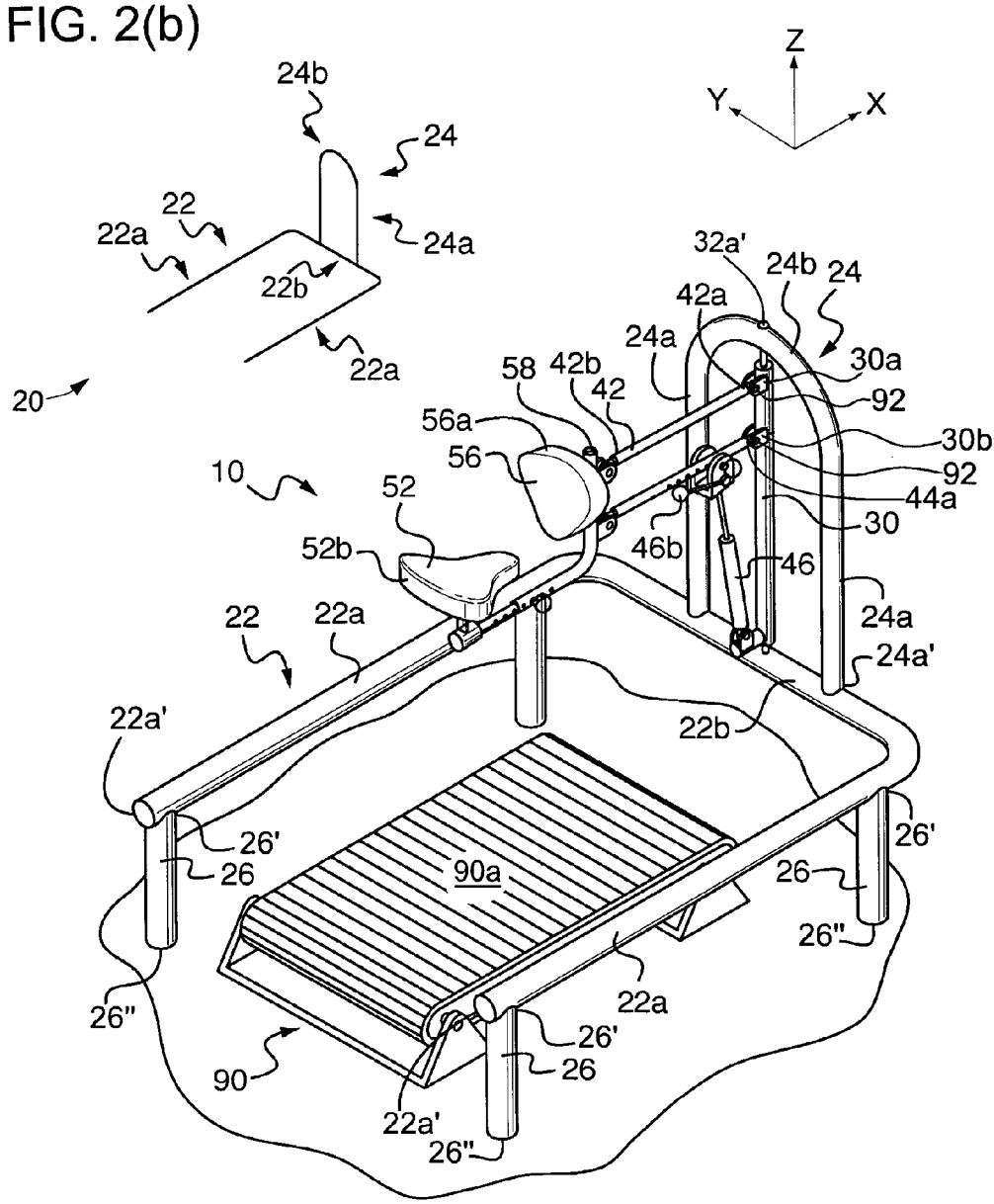

BODY SUPPORT SYSTEM FOR GAIT TRAINING EXERCISE ON A TREADMILL

CROSS REFERENCE TO RELATED APPLICATIONS

This application claims the benefit of U.S. Provisional Application No. 62/047,011 filed Sep. 7, 2014, hereby incorporated by reference in its entirety.

FIELD OF THE INVENTION

The present invention generally relates to treadmill body support systems for gait training exercise on a treadmill, and in particular to such systems where the treadmill body support system includes provisions for facilitating transfer of the user between a device such as a wheelchair and the treadmill body support system, along with the ability to adjust the user's body weight force while on the treadmill surface and to provide for lateral displacement of the user's center of gravity for lateral gait freedom of motion while exercising on the treadmill.

BACKGROUND OF THE INVENTION

A treadmill is a device that can be used for exercising a human's pelvis, hips, knees and ankles by walking (more generally described as ambulating) or running while basically remaining in a relatively fixed position over the treadmill's moving surface. Treadmill exercise can also be of aerobic benefit. Physically impaired or disabled individuals that are confined to a wheelchair or similar mobility aids, but can still safely exercise their pelvis, hips, knees and/or ankles have difficulty getting on and off of the treadmill surface for exercise. They may also experience difficulty in balancing themselves while exercising on the treadmill surface and may require a reduction in body weight forces on the treadmill surface while exercising on the treadmill surface.

During ambulation, the human body's center of mass is propelled forward. However the body's center of mass (or gravity) also moves vertically and laterally. The total lateral displacement of the center of mass is generally described in the art as tracing a sinusoidal curve with amplitude (AMP in FIG. 1) that can range from around one inch to 5 inches. The greatest lateral excursion of the center of mass occurs at the end of midstance. Thus, only one full lateral oscillation of the center of gravity (to the right and left) occurs during a gait cycle as illustrated in FIG. 1 which is a view looking down on a treadmill surface with the "FORWARD DIRECTION" arrow facing the front of a typical treadmill where a treadmill console, if used, would be located. Further the degree of lateral displacement (AMP) decreases in going from slow to fast ambulation (for example from 5 inches at 0.1 miles per hour to one inch at 1 mile per hour) and conversely, decreases in going from fast to slow ambulation.

U.S. Pat. No. 5,569,129 discloses a user gait training apparatus that can be used with a treadmill. The apparatus comprises unitary device 21 that can be rolled along the floor to which a harness means 33 can be user connected whereby a user in the harness can be vertically raised or lowered to alter body weight force. The user must put on the harness and body weight force adjustment is accomplished by overhead connection to device 21. The device may be positioned over a treadmill surface so that the user can ambulate on the treadmill surface after having entered the harness. The device allows for forward body center of mass movement. Vertical center of mass movement is restricted by the overhead harness connection to the device and there is no provision for lateral body center of mass movement. Thus gait exercising on a treadmill with the device does not allow for freedom of body (center of mass) movement in all three directions (forward, vertical and lateral) as in a normal human gait during ambulation.

U.S. Pat. No. 8,151,812 B2 discloses a wheeled walker with a seat assembly that a user can dynamically raise or lower in the vertical direction so that the user can adjust the seat assembly's vertical height to mount the wheeled walker and then dynamically raise or lower the seat assembly to adjust the degree of body force weight on the walking surface. Thus the wheeled walker allows for forward body center of mass movement and an adjustable body vertical center of mass movement. At best restricted lateral body center of mass movement can be provided to a limited degree by the caster wheels.

U.S. Pat. No. 6,821,233 B1 has a special harness connected to the user that makes it hard to get in and out of and also the lifting is done overhead. The ability to dynamically stand or to experience normal gait is very limited in the vertical motion, and with no weight-shifting lateral (left and right) movement which are critical at low walking speeds. The harness is very difficult to get in and out of for users that are wheelchair bound and has no access to reach the lower extremities to assist in physical rehabilitation.

U.S. Pat. No. 8,464,716 B2 discloses a differential air pressure system that comprises a user's chamber for maintaining an air pressure differential upon the user's body while exercising on a treadmill surface.

It is one object of the present invention to provide a treadmill body support system for gait training exercise on a treadmill with convenient transfer between the treadmill body support system positioned over a treadmill surface and a wheelchair or other mobility aid, or between the wheelchair or other mobility device and the treadmill body support system.

It is another object of the present invention to provide a treadmill body support system for gait training exercise on a treadmill with the ability to dynamically transition between a seated and standing position on the treadmill surface.

It is another object of the present invention to provide a treadmill body support system for gait training exercise on a treadmill with the ability to dynamically adjust the magnitude of the body weight force on the treadmill surface while the user is standing or ambulating on the treadmill surface.

It is another object of the present invention to provide a treadmill body support system for gait training exercise on a treadmill with the ability to allow freedom of body center of mass movement with forward, vertical and lateral displacements similar to those in a normal gait cycle while providing body stability for the user on the treadmill.

It is another object of the present invention to provide a treadmill body support system for gait training exercise on a treadmill with open access to the user's body while exercising on the treadmill by user support personnel located adjacent to the treadmill.

BRIEF SUMMARY OF THE INVENTION

In one aspect the present invention is a treadmill body support system for gaiting training exercise on a treadmill. The treadmill body support system includes a lateral displacement rotational means that in combination with other components of the treadmill body support system allows the user to ambulate on the treadmill surface with freedom of forward, vertical and lateral body center of mass movement with or without adjusting body weight loading. Static positioning of a seat in the treadmill body support system allows ease of entry and exit of the treadmill body support system and locking of the seat in any position from sitting to upright standing on the treadmill surface while dynamic movement of the seat with user adjustability of the user's variable body weight force on the treadmill surface allows freedom of forward, vertical and lateral body center of mass movement at a user selected magnitude of body weight force.

In another aspect the present invention is a method of providing gait training exercise on a treadmill with a treadmill body support system. The process of entry and exit of the treadmill body support system is facilitated by providing a static sitting height position for the seat associated with the treadmill body support system. The process of treadmill exercising on the treadmill surface is enhanced by providing a combination of dynamic adjustability of the user's body weight force on the treadmill surface and freedom of forward, vertical and lateral body center of mass movement while exercising on a moving treadmill surface.

These and other aspects of the invention are further disclosed in this specification and the appended claims.

BRIEF DESCRIPTION OF THE DRAWINGS

The figures, in conjunction with the specification and claims, illustrate one or more non-limiting modes of practicing the invention. The invention is not limited to the illustrated layout and content of the drawings.

FIG. 1 diagrammatically illustrates typical lateral body center of mass displacement through a gait cycle.

FIG. 2(a) is an isometric view of one example of a treadmill body support system for gait training exercise on a treadmill of the present invention shown with the body support system installed over a treadmill surface.

FIG. 2(b) diagrammatically illustrates references to the arms and foot of "U" shaped frame base and frame bridge shown in FIG. 2(a).

FIG. 11 is a vertical section view of the body support spring means shown in FIG. 6 at a right angle to section 8B-8B shown in FIG. 6 in its preferred embodiment of a pressurized gas cylinder in its closed or locked (static mode) position which limits the movement of the pressurized gas within the upper interior chamber 46' and lower interior chamber 46" of the gas cylinder.

FIG. 12(a) and FIG. 12(b) illustrate diagrammatically relative to FIG. 1 how rotation of lateral displacement rotational means 30 permits freedom of lateral displacement of the user's center of mass while ambulating on the treadmill surface in a treadmill body support system of present invention.

DETAILED DESCRIPTION OF THE INVENTION

Figure 3:
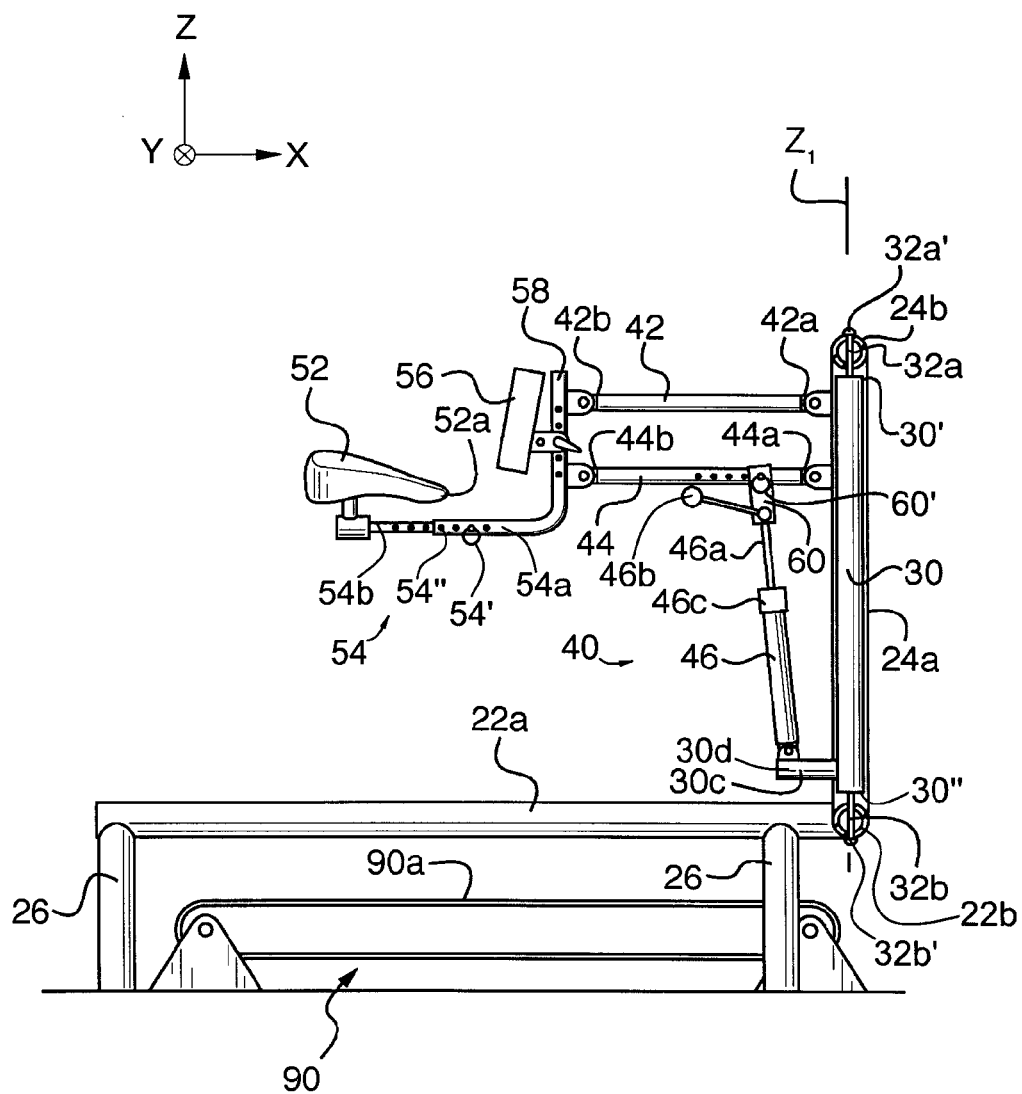
FIG. 3 is a right side elevation view of the treadmill body support system shown in FIG. 2(a) with the seating assembly shown parallel to the horizontal reference plane and a partial cross sectional view of bridge foot 24b and base foot 22b to expose lateral displacement rotational means 30.
Figure 4:
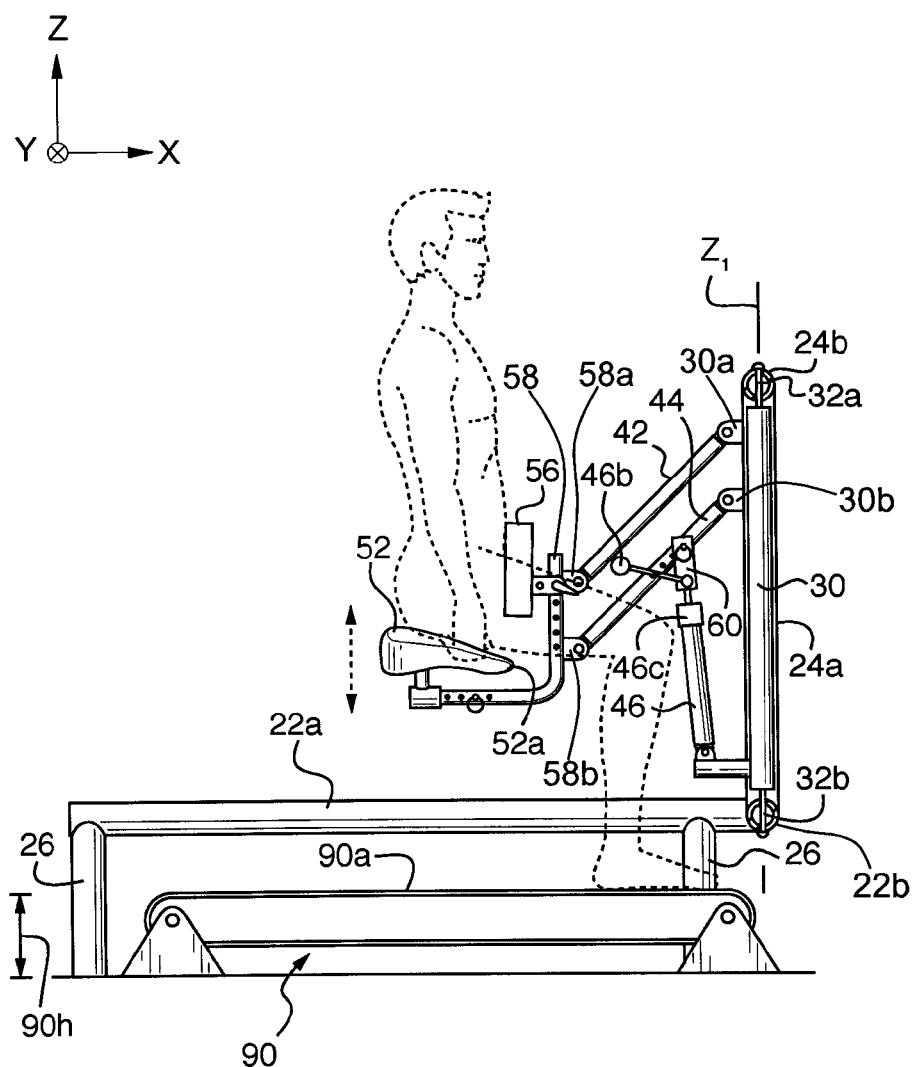
FIG. 4 is a right side elevation view of the treadmill body support system shown in FIG. 2(a) with the seating assembly shown in a lowered vertical position (treadmill body support sitting height position) for user transfer to and from the treadmill support system, for example, from, or to, a wheelchair positioned behind the seated illustrated user (in dotted lines) shown in the figure, and a partial cross sectional view of bridge foot 24b and base foot 22b to expose lateral displacement rotational means 30.
Figure 5:
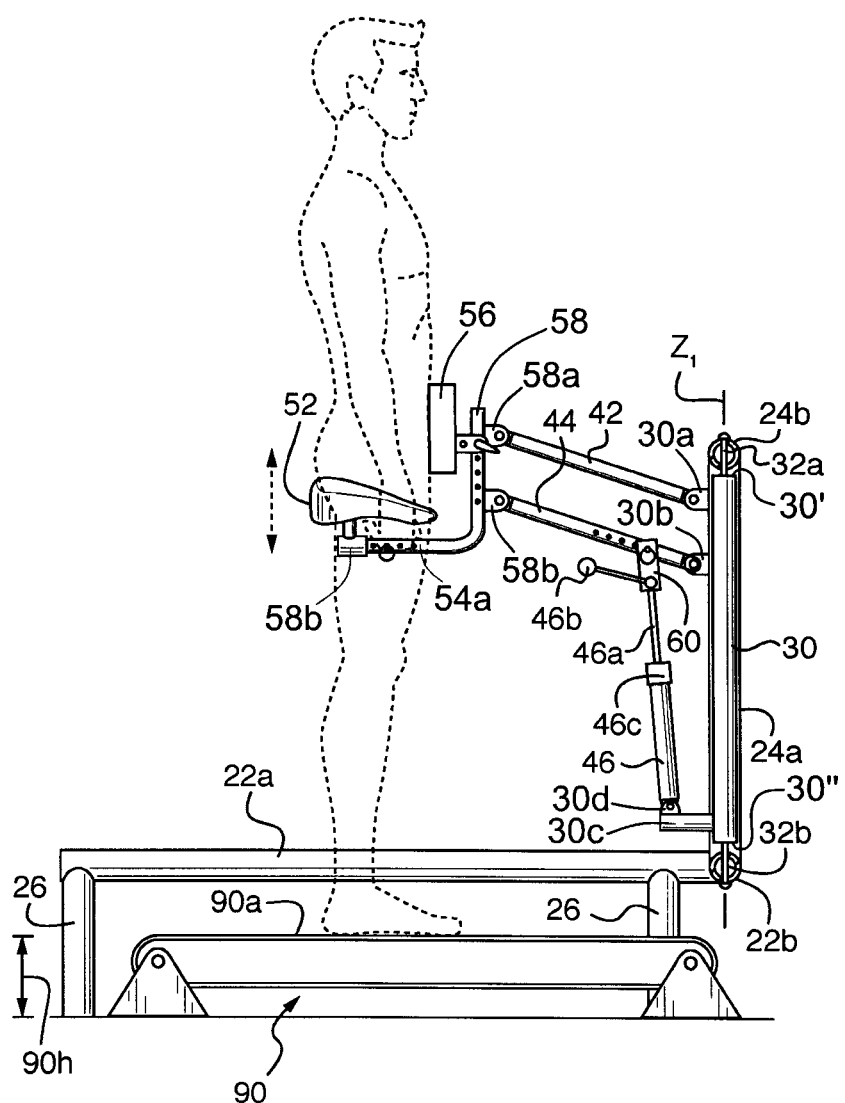
FIG. 5 is a right side elevation view of the treadmill body support system shown in FIG. 2(a) with the seating assembly shown in a raised vertical position (treadmill body support standing position) for stabilized fully erect standing of the illustrated user on the treadmill surface and a partial cross sectional view of bridge foot 24b and base foot 22b to expose lateral displacement rotational means 30.

One embodiment of a treadmill body support system 10 of the present invention for gait training exercise on a treadmill is shown in FIG. 2(a) through FIG. 5 as positioned over treadmill 90 which is partially shown diagrammatically and represents either a consumer or commercial treadmill, for example, that may, but not necessarily, have a front console with a display and control unit and/or handrails for a user to optionally hold with his or hers hands while in the treadmill body support system over the treadmill. More broadly, the treadmill body support system of present invention can be positioned over any device for ambulating or running on without actual forward movement. The treadmill is not necessarily a component of treadmill body support system 10; that is, the treadmill body support system can be arranged for placement over an existing treadmill, for example, with a console located forward of a treadmill body support system of the present invention; that is, to the right and forward (in the X-direction) of the frame bridge 24 of the body support system as shown in FIG. 2(a) so that the user may optionally have control of the treadmill's operating parameters such as speed and inclination of the treadmill surface.

In the embodiment of treadmill body support system 10 shown in the figures apparatus frame assembly 20, which may be referred to as the main frame, comprises frame base 22, frame bridge 24, and a plurality of frame elevation lifting means which in this example are frame legs 26. In this embodiment of the invention frame base 22 and frame bridge 24 each comprise a "U" shaped structure that can be a tubular material formed on rolling forming and bending apparatus into the illustrated "U" shapes. In other examples of the invention the main frame may be otherwise formed as long as it provides for positioning of the treadmill body support system over a treadmill surface and mounting of the lateral displacement rotational means with support for the support lever, position stabilizing arm and adjustable body weight support spring means. Reference to the arms and foot of each "U" shaped structure is diagrammatically illustrated in FIG. 2(b). In this example of the invention frame legs 26 comprise four tubular legs that are cylindrical in shape. Each of the legs has an upper leg end 26' suitability distributed and attached to frame base 22. In this example of the invention a frame leg is suitably fixed at upper leg end 26' to the opposing base arm ends 22a' and 22a'' of each of two base arms 22a of "U" shaped frame base 22. The function of the legs in this example of the invention is to raise frame base 22 above the vertical height $90_h$ (from a horizontal reference plane as shown, for example, in FIG. 4) of the moving platform of the treadmill that is typically a wide conveyor belt driven by an electric motor or flywheel; the moving platform will be referred to as treadmill surface 90a upon which a user's feet make contact with when the user is in the treadmill body support system of the present invention whether or not the treadmill surface is moving. The horizontal reference plane may be, for example, the floor or platform that the treadmill stands on. The lower leg end 26'' of each leg, which is opposite the upper end 26' rests on a horizontal surface below the treadmill surface in this example of the invention. In other examples of the invention each leg may consist of two or more telescoping sections to provide adjustability of the height of the frame base above the treadmill surface. Generally the longitudinal lengths of each one of the plurality of legs are equal so that frame base 22 lies in a plane parallel to the horizontal reference plane and the treadmill surface. In some applications of the invention it may be advantageous to have unequal leg lengths, for example, to establish a sloped frame base planar orientation relative to the horizontal reference plane. In some embodiments of the invention wheels may be provided at the lower leg ends to move the treadmill body support system to and from over a treadmill surface.

The lower bridge arm ends 24a' of the "U" shaped frame bridge's bridge arms 24a are suitably attached to the base foot 22b of "U" shaped frame base 22. The frame bridge is generally centered vertically (Z-direction) over base foot 22b of the "U" shaped frame base as shown in FIG. 2(a).

Rotational shaft 30 represents one example of a lateral displacement rotational means used in the treadmill body support system of the present invention. Rotational shaft 30 is pivotally attached between the vertical center (along axis $Z_1$) of bridge foot 24b of "U" shaped frame bridge 24 and the vertical center (along axis $Z_1$) of base foot 22b of "U" shaped frame base 22, and provides gait freedom of motion in the Y-direction (that is, lateral displacement). One example of such pivotal attachment is shown in the figures. In this example rotational shaft 30 is a hollow cylindrical shaft that is pivotally attached to the vertical center of the bridge foot of "U" shaped frame bridge 24 by top pin 32a and the vertical center of the base foot of the "U" shaped frame base 22 by bottom pin 32b. Top pin 32a passes through vertically oriented top and bottom pin openings in bridge foot 24b of the frame bridge and is suitably connected to top shaft end of rotational shaft 30, for example, by top threaded hole (shrink-fit) fitting 30' disposed within the hollow interior of the top shaft end of rotational shaft 30, so that when top pin has a screw thread, the top pin can be screwed into the threaded hole fitting 30'. A similar arrangement is illustrated for bottom pin 32b. Bottom pin 32b passes through vertically oriented top and bottom pin openings in base foot 22b of the frame base and is suitably connected to bottom shaft end of rotational shaft 30, for example, by bottom threaded hole (shrink-fit) fitting 30'' disposed within the hollow interior of the bottom shaft end of rotational shaft 30, so that when bottom pin has a screw thread, the bottom pin can be screwed into the threaded hole fitting 30'''. For this example of pivoting attachment, rotational shaft 30 is free to rotate about a Z-axis, $Z_1$, that is parallel to orthogonal X-Y planes since the top and bottom pins are free to rotate about the pin openings in the frame bridge and frame base, respectively, while being held within the frame bridge and frame base, respectively, by top pin head 32a' and bottom pin head 32b'.

FIG. 12(a) and FIG. 12(b) illustrate diagrammatically relative to FIG. 1 how rotation of lateral displacement rotational means 30 permits freedom of lateral displacement of the user's center of mass while ambulating on the treadmill surface in the treadmill body support system of present invention. In FIG. 12(a), looking down at a horizontal cross section of lateral displacement rotational means 30, position stabilizing arm 42 is shown in the neutral centered position. As a user in the treadmill body support system of the present invention ambulates on the moving treadmill surface, the user can experience unrestrained lateral gait movement as lateral displacement rotational means 30 rotates between left lateral displacement angle 31a (from the neutral center position) and right lateral displacement angle 31b (from the neutral center position) as shown in FIG. 12(b) where position stabilizing arm 42 is shown in double image for individual left (in dotted lines) and right (in solid lines) lateral displacements.

In another embodiment of the invention the lateral displacement rotational means may be a hollow cylindrical shaft that is fitted over a fixed shaft extending from the vertical center of bridge foot 24b of the frame bridge to the vertical center of the base foot 22b of the base frame. One or more ball bearings can be positioned between the outer surface of the fixed shaft and inner surface of the hollow cylindrical shaft so that the hollow cylindrical shaft rotates freely about a Z-axis in a similar fashion as described for rotational shaft 30.

In other examples of the invention optional rotational stops can be provided to limit the left and right rotation limits of the lateral displacement rotational means to correct or limit an excessive lateral displacement of body center of mass.

One example of a vertical (Z direction) adjustment system of the treadmill body support system of the present invention is vertical adjustment system 40 comprising position stabilizing arm 42, support lever 44 and body weight support means.

Position stabilizing arm 42 has stabilizing arm opposing ends 42a and 42b and support lever 44 has support lever opposing ends 44a and 44b. Position stabilizing arm end 42a and support level end 44a are rotationally connected to rotational shaft 30, and position stabilizing arm end 42b and support level end 44b are rotationally connected to front body support post 58. In this example of the invention rotational shaft connecting means are "U" shaped connectors 30a and 30b and front body support post connecting means are "U" shaped connectors 58a and 58b. Position stabilizing arm end 42a and support level end 44a are fitted respectively within "U" shaped connectors 30a and 30b, and position stabilizing arm end 42b and support level end 44b are fitted respectively within "U" shaped connectors 58a and 58b. A suitable fastener 92, such as a cotter pin or threaded screw (with bolt) passes through horizontally aligned holes in each combination of a "U" shaped connector and the respective position stabilizing arm end or support level end within the "U" shaped connector to allow rotation of the position stabilizing arm and the support level about a Y-axis. In other examples of the invention other types of interconnecting means between the position stabilizing support arm and support lever, and the rotational shaft and front body support post, that allow rotation of the position stabilizing support arm and support lever about the Y-axis relative to the rotational (about a Z-axis) shaft and front body support post 58 (with freedom of motion in the vertical (or Z-axial) direction) can be used.

Support lever 44 is attached to a body weight support spring means. The body weight support spring means lowers or raises the support lever 44. The position stabilizing arm 42 is likewise lowered or raised in tandem with the support lever 44 in response to the activation of the body weight support spring means. The body weight support spring means lowers or raises the body seating assembly of the present invention simultaneously with the lowering or raising of support lever 44 and position stabilizing arm 42. One example of a body seating assembly is body seating assembly 50 comprising seat 52, seat support extension 54, front body support 56 and front body support post 58.

In the present example of the invention, support lever 44 is at an elevational (Z-directional) height below position stabilizing arm 42. In alternative embodiments of the invention, support lever 44 can be positioned above position stabilizing arm 42 so long as support lever 44 and position stabilizing arm 42 remain parallel to each other and the support lever 44 and position stabilizing arm 42 are of the same length.

As seat 52 is lowered toward, or raised away, from the treadmill surface 90a through the activation of the body weight support spring means, seat 52 and front body support 56 maintain a constant angle with respect to the treadmill surface. The rotational connections between rotational shaft 30 and front body support post 58 at the opposing ends of both position stabilizing arm 42 and support lever 44, along with their parallel orientation and equality of length enable seat 52 to rotate or swivel to the degree necessary to maintain seat 52 and front body support 56 at a constant angle with respect to treadmill surface 90a. The maintenance of this angle with respect to the treadmill surface imparts stability and balance to the user while positioned over the treadmill surface. The preservation of this angle facilitates pelvic stability and aids in enabling the stabilized user's fit imparted by the seat and front body support to be realized. The preservation of this angle with respect to the treadmill surface allows the user in the treadmill body support system of the present invention to maintain the user's body orientation, posture and pressure points upon the seat and body support as the user switches back and forth between standing on the treadmill surface (either stationary or while ambulating or running), partially standing on the treadmill surface (transitioning between a standing and sitting position) and sitting position (for example, for transfer to, or from, a wheelchair on or over the treadmill surface) and thereby maintain balance.

Figure 7:
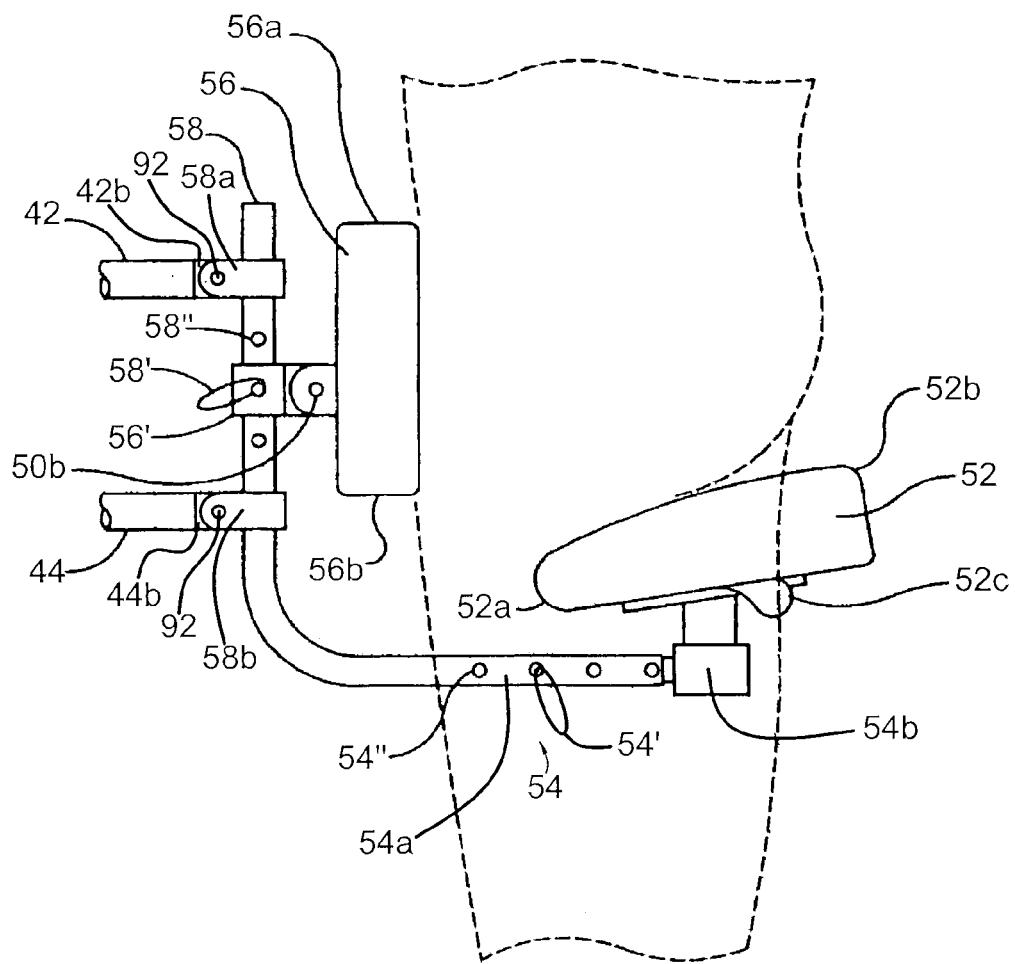
FIG. 7 is a left side elevation view of the seat, seat support extension, front body support and front body support post of the treadmill body support system shown in FIG. 2(a) with an illustrated user shown fitted in the system and in the treadmill body support standing position.
Figure 9:
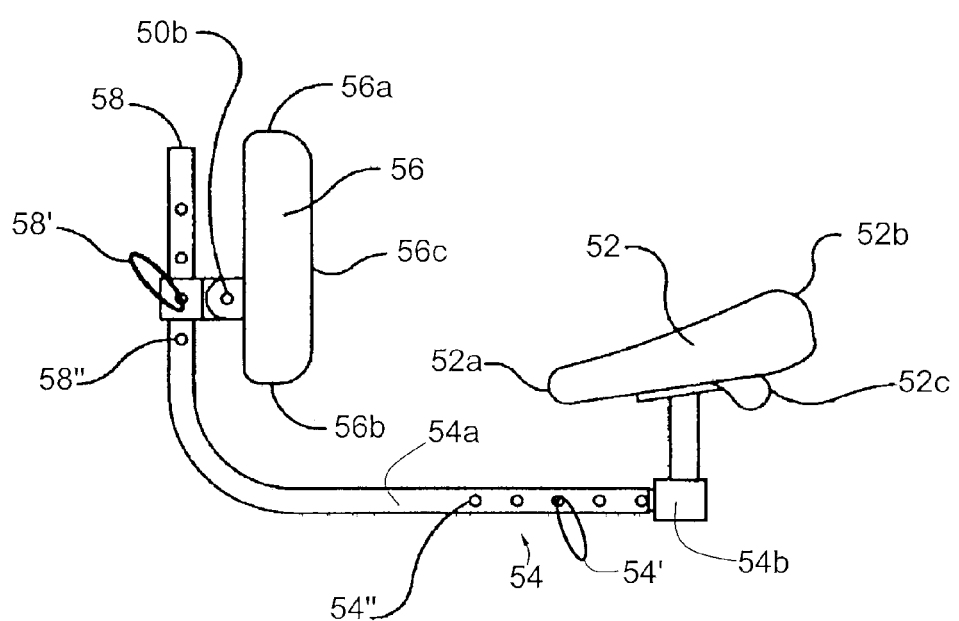
FIG. 9 is a left side elevation view of the seat assembly used with the treadmill body support system shown in FIG. 2(a).

Reference is made to FIG. 7 and FIG. 9 showing a side view of seat 52 in the example of the invention shown in the drawings. The seat preferably has a broad width in the back to support a user's posterior that tapers to a narrower width in the front of the seat. The seat is mounted on a seat support extension 54. Seat support extension 54 connects to the front body support post 58. In the embodiment of the invention shown in the drawings seat support extension 54 comprises non-telescoping seat support extension section 54a into which telescoping seat support extension section 54b can slide into or out of Telescoping seat support extension section 54b has a fitting at one end that attaches the telescoping seat support extension section to seat 52.

In a preferred embodiment, the front body support post 58 and seat support extension 54 are separate sections of a continuous curved member in which a first section of seat support extension 54 and a second section of front body support post 58 are disposed at an angle close to 90 degrees or slightly in excess of or less than 90 degrees as illustrated, for example, in FIG. 7 and FIG. 9.

The seat can be adjustably positioned along the seat support extension 54 by sliding telescoping seat support extension section 54b, which is attached to the seat at one end, into or out of non-telescoping seat support extension section 54a to move the seat respectively toward or away from the front body support 56. The seat can be locked into position by means of an adjustment pin 54' with loop to facilitate the removal or insertion of the pin into any one of the several regularly spaced-apart openings 54" along the seat support extension 54. The seat front 52a can be tilted downward or upward with seat back 52b correspondingly tilted upward or downward by means of a seat tilt adjustment lever 52c which activates loosening means to allow the tilt of the seat to be adjusted or tightening means to lock the tilt of the seat into a fixed position. Alternatively an adjustment nut can activate the loosening or tightening means.

The front body support 56 is adjustably positioned upon the front body support post 58 by means of a front body support connector 56' which slides along the front body support post 58 in a substantially vertical up or down direction. The elevational height and position of the front body support can be locked by means of adjustment pin 58' with loop to facilitate the removal or insertion of the pin into any one of the regularly spaced-apart openings 58" along the front body support post 58. The front body support 56 is attached to the front body support post 58 by a swivel joint 50b allowing the front body support to tilt or swivel so that the front body support top edge 56a can move either toward or away from seat 52 as front body support bottom edge 56b correspondingly moves in the opposite direction either away from or toward the seat. The front body support will swivel as the user's body contacts the front surface 56c of the front body support and in response to the movement of the user's body while ambulating or running on the treadmill surface and the lateral displacement rotational means allows lateral displacement of the body center of mass.

In a preferred embodiment, front body support 56 has a padded, flat or slightly contoured surface for contact with the user's body. In a preferred embodiment, the bottom edge 56b of the front body support is adjusted to contact against the pubic bone of the user and the top edge 56a of the front body support 56 is generally positioned in the waist area of the user.

In a preferred embodiment, the seat is adjusted so that the seat front 52a is tilted slightly downward with the seat back 52b tilted correspondingly upward as shown, for example, in FIG. 7 and FIG. 9. The seat and front body support form an angle less than ninety degrees. The user fits into this space defined by the less than ninety degree angle. The user, when positioned upon the seat which is tilted in this downward direction, is wedged against the front body support which swivels to firmly contact the body of the user. The seat back 52b, with its broad width, is in a raised position supporting the posterior of the user while the user is snugly wedged against the front body support 56 which supports the pelvic area of the user. Thus, the user is aided in maintaining his or her body position, posture and balance as the user sits, stands, ambulates or runs while the user is positioned in the treadmill body support system of the present invention and on the treadmill surface. The body position, posture and balance is further maintained by the preservation of the angle of the seat and front body support relative to the treadmill surface as the center of gravity of the user moves up and down as the user walks or changes from a standing to a sitting position or vice versa.

In an alternative embodiment front body support 56 can be shaped to support the abdomen or chest of the user, and may include arm supports and arm rests.

In an alternative embodiment straps can be provided which are attached at either or both of front body support 56 and seat 52 and wrap around the user to provide additional support and balance.

Figure 6:
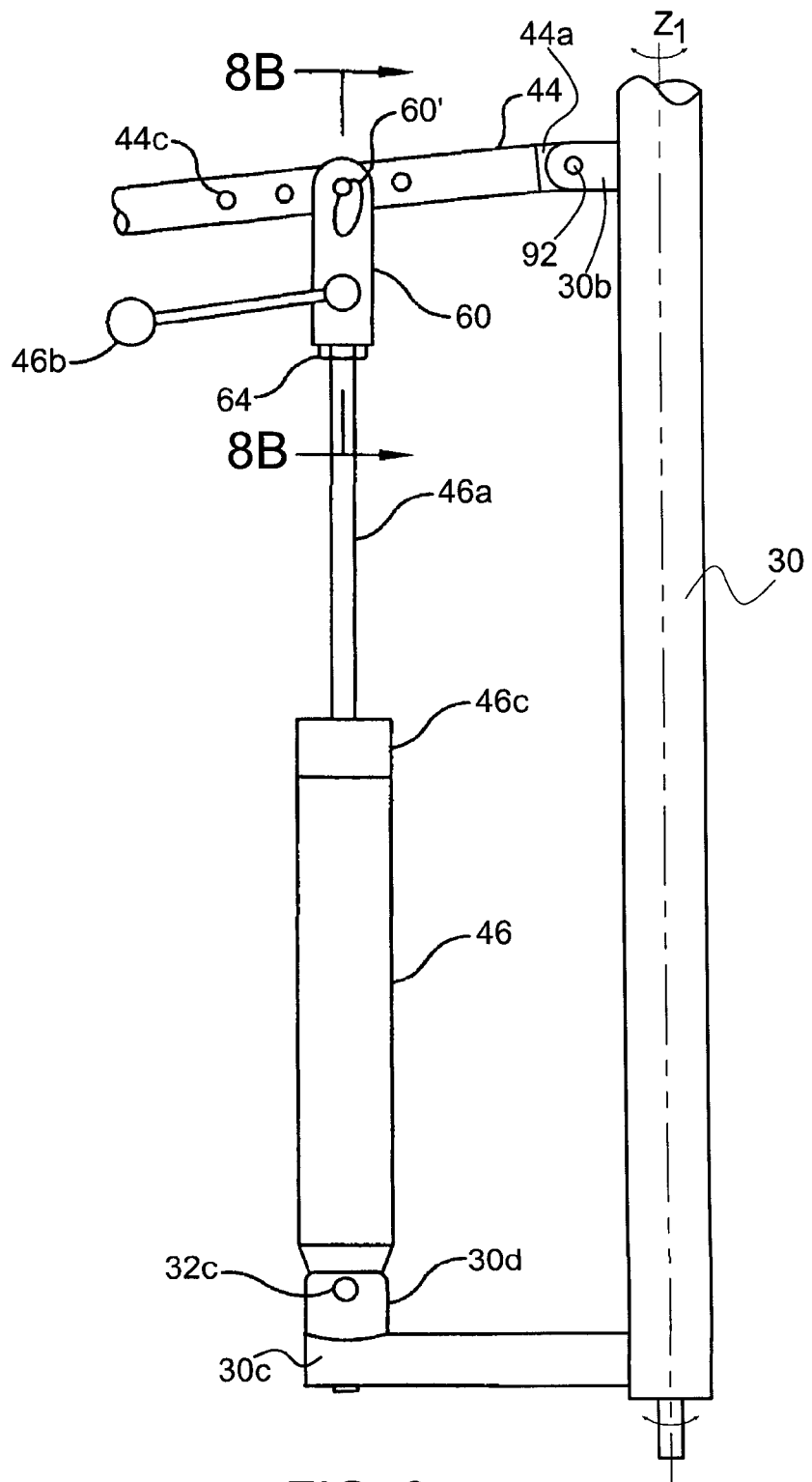
FIG. 6 is an enlarged partial right side view of the body weight support spring means with its connections at both ends in the treadmill body support system shown in FIG. 2(a).

Referring to FIG. 6, in a preferred embodiment, the body weight support spring means comprises a gas spring or a charged preloaded gas-charged cylinder 46 (also referred to as gas cylinder 46). The gas cylinder is provided with a piston rod 46a extending upward towards "U" shaped connector 60.

Figure 8A:
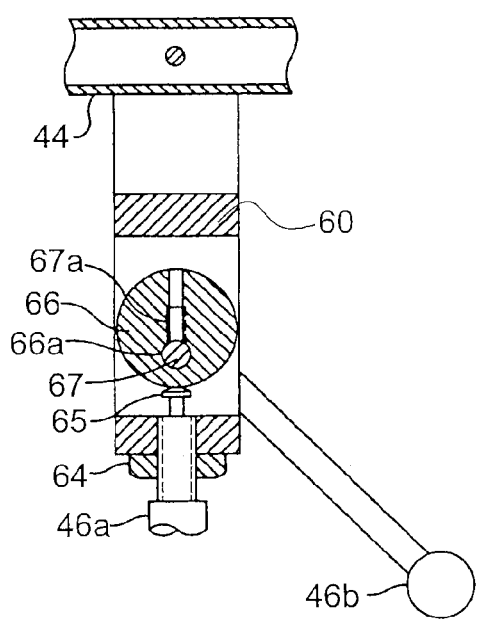
FIG. 8(a) is a section view of a part of the body weight support spring means including the piston rod, "U" shaped connector, off-center disk, compression pin and control lever in the directions of the arrows 8A-8A in FIG. 8(b).
Figure 8B:
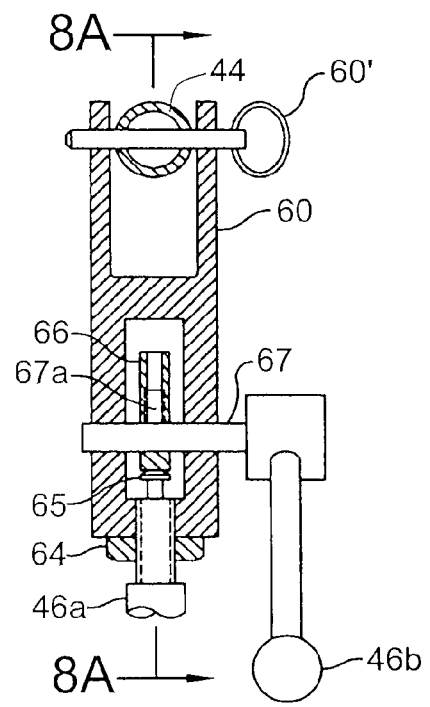
FIG. 8(b) is a section view of a part of the body weight support spring means including the piston rod, "U" shaped connector, off-center disk, compression pin and control lever in the directions of the arrows 8B-8B in FIG. 6.

Referring to FIG. 8(a) and FIG. 8(b) along with FIG. 6, the "U" shaped connector 60 houses an off-center circular disk 66 through which a control lever shaft 67 passes. The "U" shaped connector has openings to allow the passage of the control lever shaft 67 through the sides of the "U" shaped connector to contact the off-center circular disk 66. As depicted in FIG. 8(a) and FIG. 8(b) an end of piston rod 46a is positioned adjacent to the gas control pin 65 within the "U" shaped connector 60. A stabilizing piston rod nut 64 is positioned around the piston rod 46a where piston rod 46a is connected to the "U" shaped connector 60. The stabilizing piston rod nut 64 securely limits any rotational or horizontal sideways movement of the piston rod while permitting the piston rod freedom of movement into and out of the gas cylinder. The "U" shaped connector 60 is connected to the support lever 44 by an adjustment pin 60' with loop to facilitate the removal or insertion of the pin into any one of the several regularly spaced-apart openings 44c along the support lever 44. In the illustrated embodiment of the invention, as shown in FIG. 6, gas cylinder 46 is rotationally connected to rotational shaft 30 via rotational shaft offset 30c via rotational connector 30d and secured by rotational pin 32c. The gas cylinder can pivot rotationally about the rotational connector 30d and rotational pin 32c (about a Y-axis) as the "U" shaped connector 60 and adjustment pin 60' with loop are positioned at selected locations along the spaced-apart openings 44c of the support lever and locked into place at one of the spaced-apart openings as shown in FIG. 6.

The gas cylinder and piston rod may be reversed in their orientation so that the gas cylinder may be connected to support lever 44 by the adjustment pin 60' which is inserted into one of the spaced-apart openings 44c. In this reverse orientation piston rod 46a is rotationally connected to rotational shaft offset 30c by the "U" shaped connector 60. In this reversed orientation the "U" shaped connector is rotationally connected to rotational shaft offset 30c by rotational pin 32c which is inserted into rotational connector 30d. In this reverse orientation the gas control pin 65 can be compressed or released by means of cable wires. The cable wires can be activated by hand or foot to rotate the off-center disk 66 directly or to rotate the control lever shaft 67 which in turn rotates the off-center disk 66 to compress or release the gas control pin 65 to lock or unlock the body weight support means.

The gas cylinder's connection to the rotational shaft offset 30c, as generally shown in FIG. 2(a) through FIG. 5, is positioned so that the body weight support spring means is approaching a perpendicular angle to support lever 44 or is positioned to minimize the deviation from a perpendicular angle of the angle formed between the lengthwise axis of the body weight support spring means and the support lever. The maintenance of a perpendicular angle, or close to a perpendicular angle, allows for the transmission of the supporting forces with maximum efficiency and with minimal negation of the mechanical advantage obtained as the distance increases between the pivot point of the support lever 44 at the connection with rotational shaft 30 and the support lever's connection with the spring means at the "U" shaped adjustment pin 60'.

Connecting the body weight support spring means at different locations with adjustment pin 60' along support lever 44 at one of the openings 44c will result in a varied body weight supporting force or unweighting force applied to support lever 44, seat 52 and the user positioned in the treadmill body support system of the present invention. As the distance between the pivoting axis of the support lever at the connection with rotational shaft 30 and the connection of the body weight supporting spring means into one of the openings 44c along support lever 44 with adjustment pin 60' increases, the mechanical advantage of the force supplied by the body weight support spring means (comprising gas cylinder 46 in one example of the invention) increases.

In a preferred embodiment the placement of the "U" shaped connector 60 and adjustment pin 60' along the support lever in a direction toward the seat will result in a greater support force imparted to the seat and the user while placement toward the rotational shaft 30 will result in a lesser support force imparted to the seat and the user. The amount of supporting force desired to be exerted upon the seat, and thereby the user positioned upon the seat, can be adjusted depending on the weight of the user and the degree of weight support assistance the user requires while ambulating or running on the treadmill surface, standing stationary on the treadmill surface, or in the seated position in the treadmill body support system of the present invention while on the treadmill surface.

In an alternative embodiment, the location of the connection between support lever 44 and the body weight support spring means can be moved and locked into place by a turning screw mounted on rotational shaft 30 which moves the support lever toward or away from the rotational shaft by a threaded sleeve which is mated with grooves inside the support lever. Turning the screw will adjust the support force imparted to the seat and the user.

In the illustrated embodiment of the invention shown in FIG. 6 the body weight support spring means comprises gas cylinder 46 into which piston rod 46a retracts into or extends out of. The gas cylinder is preloaded with pressurized gas which is held in sealed chambers within the cylinder. Depending on a particular user of the treadmill body support system of the present invention, the gas cylinder can be changed to provide a supporting force that fully supports or partially supports the particular user's supporting weight requirements. For example, different gas cylinders can be employed to accommodate children or those weighing less than 100 pounds to those weighing over 300 pounds. Additionally when a particular user's weight support needs change as the user becomes stronger or weaker the gas cylinder can be changed to provide the appropriate amount of support required.

Figure 10:
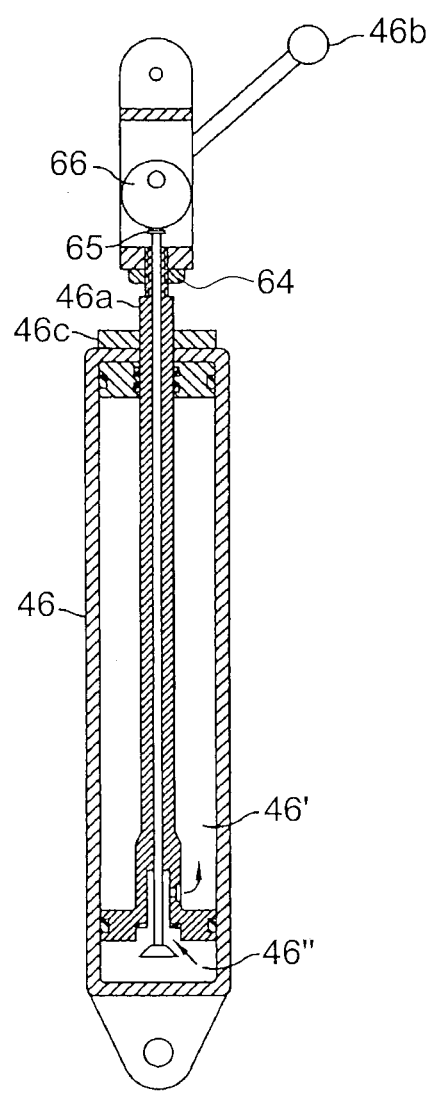
FIG. 10 is a vertical section view of the body weight support spring means shown in FIG. 6 at a right angle to the section 8B-8B shown in FIG. 6 in its preferred embodiment of a pressurized gas cylinder in its activated (dynamic mode) position allowing for movement of the pressurized gas within the chambers of the gas cylinder as illustrated by the arrows between upper interior chamber 46' and lower interior chamber 46".

The gas cylinder has control lever 46b as illustrated in FIG. 8(*a*) and FIG. 8(*b*). Control lever shaft 67 is connected to control lever 46b at one end and extends at its other end onto the surface of, or through an opening 66a, of off-center circular disk 66. The contact point of control lever shaft 67 onto the surface of the off-center circular disk 66 or opening 66a of the off-center circular disk 66 is not at the center point of the off-center circular disk 66 but rather is at an off-center location of the disk 66. A locking screw 67a clamps down the control lever shaft 67 to the off-center circular disk 66. When moved, the control lever 46b travels in a circular arc which rotates the control lever shaft 67 which in turn rotates the off-center circular disk 66. As the off-center circular disk rotates in an off-center fashion it will either compress or release the gas control pin 65. When the control lever is turned to an activated release (dynamic mode) position, the off-center circular disk moves the gas control pin 65 disposed adjacent to, and in physical contact with, the off-center circular disk 66. Upon activation, the gas control pin's movement releases the pressurized gas for movement within the sealed chamber of the gas cylinder as shown in FIG. 10. The pressurized gas exerts a force upon the piston causing the piston to extend out from the gas cylinder. When the pressurized gas is available to move within the chambers of the sealed gas cylinder the piston can move within the cylinder in response to the force applied by the user. As a result the seat assembly and user can move in an up or down direction and can provide partial body weight bearing support.

When the user desires to immobilize the seat from up and down movement, or desires full body weight support, control lever 46b is rotated so that the off-center circular disk 66 releases the pin from the activated position to a closed or locked (static mode) position. In the closed or locked positioned pin 65 limits the movement of the gas within the gas cylinder as shown in FIG. 11. In the locked rigid position, the piston rod 46a is immobilized and will not retract into or extend from the gas cylinder in response to the body force applied by the user of the treadmill body support system of the present invention. Thus the support lever and seat assembly which are supported by the gas spring's position are likewise maintained in a fixed stationary position.

When the control lever 46b is turned to the activated released (dynamic mode) position, the pressurized gas transmits its force through the piston rod to provide partial body weight bearing support to the user or in some circumstances full body weight bearing support. The user of the treadmill body support system with the aid of partial body weight support can exert his or hers own variable body force by muscular effort in the legs and torso to support running, ambulating or standing efforts on the treadmill surface. The user can let his or hers body weight push seat 52 down against the gas spring's supporting force to an elevation desired for sitting or for transferring to a wheelchair positioned behind or over the treadmill surface and then lock the gas spring into place. This allows the user to slide off seat 52 into the wheelchair positioned on or over the treadmill surface with the seat in a fixed stationary position and without the seat exerting an upward force upon the user and without the risk of destabilizing the user.

In general the user can turn control lever 46b to the locked (static mode) position whenever the user desires to rest on the treadmill surface whether in a standing, partially standing, or in a treadmill exercising phase or when transferring to a wheelchair. Similarly when transferring from a sitting or resting phase the user can turn the control lever to the activated release (dynamic mode) position when the user desires partial weight bearing support to lift himself or herself to a standing or partially standing position and intends to use his or hers own efforts to the extent he or she is able for treadmill exercise, standing, moving or to partially support himself or herself on his or hers legs. The user can switch control lever 46b back and forth between the released and locked positions and move from a sitting to a standing or partially standing position which is either in a locked fully supported phase or a dynamic partial weight support phase and is not simply letting the seat passively support him or her on the treadmill surface.

The user positioned on seat 52 can transition from a standing to a sitting position by letting his or hers weight gradually lower himself or herself while receiving partial weight bearing support from the body weight support spring means 46. The user can then turn control lever 46b to the locked position while sitting on the seat 52 of the treadmill body support system and slide off onto a wheelchair positioned behind or over the treadmill surface. The user can transfer from the wheelchair to an upright standing position on the treadmill surface by sliding from the wheelchair onto seat 52 and activating control lever 46b to lift the body into a standing or more upright position.

The user can move the seat to numerous different elevations by activating control lever 46b and letting more or less of his or hers body weight rest upon the seat. The height of the seat and the position of the user whether in a standing, sitting or partially standing position on the treadmill surface can be changed in any desired varied, random or repeated sequence. The amount of weight supporting force the user experiences can be adjusted without changing the gas cylinder by sliding the body weight support spring means along the support lever 44 either farther from, or closer to, the fulcrum point of the support lever's rotational connection to the rotational shaft 30.

If the user experiences an uncontrolled or sudden weakening on the treadmill in the body support system of the present invention so that the legs cannot support the user when control lever 46b is in the activated position and the gas cylinder or body weight support spring means is providing partial weight bearing support, stop limiting means 46c are provided. The stop limiting means can consist of a stop collar or stop block made from a cushioned force absorbing material.

The stop limiting means will arrest the downward movement of the seat to a pre-determined elevation off the treadmill surface in a fixed down position of the seat to keep the user from falling and contacting the treadmill surface.

One method of using the treadmill body support system of the present invention is as follows. The user can mount and position his or hers body in the seat assembly of a treadmill body support system of the present invention from a standing position or from a wheelchair positioned over or on a treadmill surface, for example, by adjusting the seat to a stationary sitting height position by movement of the control lever to the static mode position when the treadmill body support system is in the treadmill body support sitting height position. Positioning of the wheelchair over the treadmill surface can be accomplished by providing a wheelchair ramp that straddles over the treadmill surface. When the user has positioned his or hers body in the seat assembly of the treadmill body support system with the pelvis between seat 52 and front support 56 the user is conveniently and safely positioned in the treadmill body support system.

The user, or user support personnel positioned next to the treadmill and body support system of the present invention, can place control lever 46b in the dynamic mode position which will free the piston and give upward body support force to assist the user in standing on the treadmill.

In the standing position on the treadmill the user can exercise in dynamic standing with lateral gait displacement; bending knees, stretch further up on the tip of the toes, or weight shift between left and right legs while the user is safely positioned in the treadmill body support system. If the user needs to rest, the user, or support personnel, can lock the piston and sit in the standing position on the treadmill in the treadmill body support system.

When the user is ready to ambulate on the treadmill surface, the user, or support personnel, can place control lever 46b in the dynamic mode position and adjust the treadmill surface speed to the desired value. The user can ambulate on the treadmill surface with supported body, including the pelvis, and will move up and down to establish a vertical gait displacement of the body center of mass while supported and with reduced body force on the treadmill surface, and will move left and right as the body shifts weight between the right leg and left leg to establish a lateral gait displacement while still supported as allowed by rotation of lateral displacement rotational means 30 interaction with the other components of the treadmill body support system of the present invention.

Due to the absence of side components in the treadmill body support system of the present invention, user support personnel have unimpeded access to assist and guide the user positioned in the body support system from either side of the body support system either by manipulation of the user's body parts, operation of control lever 46b, or other adjustments to the treadmill body support system.

When the treadmill exercise has been completed, the user can return to the sitting position in the treadmill body support system and easily transfer, for example, with backwards motion to a wheelchair that has been rolled up behind the user on a wheelchair ramp. While the term wheelchair is used to describe the transfer device with the treadmill body support system of the present invention, the transfer device may also be variants of a wheelchair, such as a standing wheelchair, knee scooter or other assisted mobility device used to transfer an impaired or disabled individual from one location to another.

Reference throughout this specification to "one example or embodiment," "an example or embodiment," "one or more examples or embodiments," or "different examples or embodiments," for example, means that a particular feature may be included in the practice of the invention. In the description various features are sometimes grouped together in a single example, embodiment, figure, or description thereof for the purpose of streamlining the disclosure and aiding in the understanding of various inventive aspects.

The present invention has been described in terms of preferred examples and embodiments. Equivalents, alternatives and modifications, aside from those expressly stated, are possible and within the scope of the invention. Those skilled in the art, having the benefit of the teachings of this specification, may make modifications thereto without departing from the scope of the invention.

The invention claimed is:

1. A treadmill body support system for gait training exercise of a user on a treadmill, the treadmill body support system comprising:

a stationary support frame;

a lateral displacement rotational means vertically oriented and rotationally connected about a vertical axis to the stationary support frame;

a support lever extending between the lateral displacement rotational means and a front body support post, the support lever connected rotationally at a first support lever end to the front body support post and connected rotationally at a second support lever end to the lateral displacement rotational means;

a front body support mounted on the front body support post by a swivel joint so that the front body support is configured to be tilted and adjustably positioned along the front body support post upward or downward, the front body support having a front planar surface;

a seat having a front seat end and a back seat end for supporting the user, the seat mounted on a seat support extension connected to the front body support post and wherein the front seat end is positioned in a direction facing the front body support and the lateral displacement rotational means so that the seat positions the user to face the lateral displacement rotational means to enable the user's body freedom of a lateral gait movement when the stationary support frame is positioned over a treadmill surface and wherein the seat is configured to be adjustably positioned along the seat support extension closer toward or further away from the front body support and wherein the seat is adjustably tilted downward so that the user supported by the seat will be wedged between the seat and the front body support with the user's abdominal region in contact with the front body support;

a position stabilizing arm positioned at an elevation higher than the support lever and parallel to the support lever, the position stabilizing arm extending between the front body support post and the lateral displacement rotational means and being rotationally connected at a first position stabilizing arm end to the front body support post and rotationally connected at a second position stabilizing arm end to the lateral displacement rotational means so that the seat and the front body support are maintained at a constant angle with respect to the treadmill surface as the position stabilizing arm and the support lever move rotationally about the lateral displacement rotational means and the front body support post for the lateral gait movement of the user;

an adjustable body weight support spring means rotationally connected to the lateral displacement rotational means for applying an adjustable full or partial weight-bearing supporting force to the support lever so that the seat, the front body support and the user wedged between the seat and the front body is configured to move up or down and laterally responsive to a variable body force supplied by the user as the user walks, stands or sits over the treadmill surface in the treadmill body support system; and a control lever mounted on the adjustable body weight support spring means so that upon movement of the control lever an off-center circular disk is turned to a static mode position which releases a gas control pin to limit the movement of a pressurized gas within the adjustable body weight support spring means so that the movement of the seat and the front body support is configured to be locked at variable fixed elevations including a treadmill body support sitting height position to allow the user to enter or exit the treadmill body support system from a wheelchair sitting position and hold the seat, the front body support and the user in a continuous treadmill body support sitting position without the application of the user's body weight force or an external force and so that upon further movement of the control lever the off-center circular disk is turned to a dynamic mode position to activate the gas control pin to release the movement of the pressurized gas within the adjustable body weight support spring means so that the seat, the front body support and the user are not restrained to the treadmill body support sitting height position or a treadmill body support fixed elevational position and is configured to move to a treadmill body support standing or a treadmill body support walking position on the treadmill surface with the user supported by the adjustable full or partial weight-bearing supporting force applied by the adjustable body weight support spring means to allow the user's body freedom of a vertical gait movement.

2. A treadmill body support system of claim 1 wherein the adjustable body weight support spring means comprises a gas-charged cylinder having a piston rod extending from or retracting into the gas-charged cylinder to enable a piston rod movement of the piston rod in response to the variable body force supplied by the user.

3. A treadmill body support system of claim 2 wherein the control lever locks the piston rod movement extending from or retracting into the gas-charged cylinder and releases the piston rod to enable the piston rod movement of the piston rod in response to the variable body force supplied by the user.

4. A treadmill body support system of claim 2 wherein the adjustable body weight support spring means is provided with a stop means for limiting a downward movement of the seat and for providing a fixed down position of the seat.

5. A treadmill body support system of claim 1 wherein the adjustable body weight support spring means is configured to be fixed into a fixed position at one of several spaced-apart openings on the support lever to provide a body weight supporting force which varies depending on the fixed position.

6. A treadmill body support system of claim 1 wherein the adjustable body weight support spring means is rotationally connected to the lateral displacement rotational means at an extension of the lateral displacement rotational means so that the adjustable body weight support spring means is positioned to substantially form a perpendicular angle between a lengthwise axis of the adjustable body weight support spring means and the support lever.

7. A treadmill body support system of claim 1 wherein the lateral displacement rotational means comprises a rotational shaft pivotally mounted to the stationary support frame.

8. A treadmill body support system of claim 7 wherein the rotational shaft comprises a hollow cylinder having a top pin connecting means and a bottom pin connecting means, the top pin connecting means and the bottom pin connecting means each pivotally connected to the stationary support frame and attached respectively to the top pin connecting means and the bottom pin connecting means to pivotally mount the hollow cylinder to the stationary support frame.

9. A treadmill body support system of claim 1 wherein the stationary support frame comprises a "U" shaped horizontally oriented base frame having a base foot and a "U" shaped vertically oriented bridge frame having a bridge foot, the "U" shaped vertically oriented bridge frame centered on the base foot of the "U" shaped horizontally oriented base frame, the lateral displacement rotational means centered between the centers of the bridge foot and the base foot.

10. A treadmill body support system for gait training exercise of a user on a treadmill, the treadmill body support system comprising:
 a stationary support frame;
 a lateral displacement rotational means vertically oriented and rotationally connected about a vertical axis to the stationary support frame;
 a support lever extending between the lateral displacement rotational means and a front body support post, the support lever connected rotationally at a first support lever end to the front body support post and connected rotationally at a second support lever end to the lateral displacement rotational means;
 a front body support mounted on the front body support post, the front body support having a front planar surface;
 a seat having a front seat end and a back seat end for supporting the user, the seat mounted on a seat support extension connected to the front body support post and wherein the front seat end is positioned in a direction facing the front body support and the lateral displacement rotational means so that the seat positions the user to face the lateral displacement rotational means to enable the user's body freedom of a lateral gait movement when the stationary support frame is positioned over a treadmill surface;
 a position stabilizing arm positioned at an elevation higher than the support lever and parallel to the support lever, the position stabilizing arm extending between the front body support post and the lateral displacement rotational means and being rotationally connected at a first position stabilizing arm end to the front body support post and rotationally connected at a second position stabilizing arm end to the lateral displacement rotational means so that the seat and front body support are maintained at a constant angle with respect to the treadmill surface as the position stabilizing arm and the support lever move rotationally about the lateral displacement rotational means and the front body support post for the lateral gait movement of the user;
 an adjustable body weight support spring means rotationally connected on the lateral displacement rotational means for applying an adjustable full or partial weight-bearing supporting force to the support lever so that the seat, the front body support and the user is configured to move up or down and laterally responsive to the variable force supplied by the user as the user walks, stands or sits over the treadmill surface in the treadmill body support system; and
 a control lever mounted on the adjustable body weight support spring means so that upon movement of the control lever to a deactivate lever position the movement of the seat and the front body support is configured to be locked at variable fixed elevations including a treadmill body support sitting height position to allow the user to enter or exit the treadmill body support system from a wheelchair sitting position and hold the seat, the front body support and the user in a continuous treadmill body support sitting position without the application of the user's body weight force or an external force and so that upon further movement of the control lever to an activate position so that the seat, the front body support and the user are not restrained to the treadmill body support sitting height position or a treadmill body support fixed elevational position and is configured to move to a treadmill body support standing or a treadmill body support walking position on the treadmill surface with the user supported by the adjustable full or partial weight-bearing supporting force applied by the adjustable body weight support spring means to allow the user's body freedom of a vertical gait movement.

11. A method of supporting a disabled or impaired user on a treadmill surface with a treadmill body support system positioned over the treadmill surface where the treadmill body support system comprises:

a stationary support frame;

a lateral displacement rotational means vertically oriented and rotationally connected about a vertical axis to the stationary support frame;

a support lever extending between the lateral displacement rotational means and a front body support post, the support lever connected rotationally at a first support lever end to the front body support post and connected rotationally at a second support lever end to the lateral displacement rotational means;

a front body support mounted on the front body support post by a swivel joint so that the front body support is configured to be tilted and adjustably positioned along the front body support post up or down, the front body support having a front planar surface;

a seat having a front seat end and a back seat end for supporting the disabled or impaired user, the seat mounted on a seat support extension connected to the front body support post and wherein the front seat end is positioned in a direction facing the front body support and the lateral displacement rotational means so that the seat positions the disabled or impaired user to face the lateral displacement rotational means to enable the disabled or impaired user's body freedom of a lateral gait movement when the stationary support frame is positioned over a treadmill surface and wherein the seat is configured to be adjustably positioned along the seat support extension closer toward or further away from the front body support and wherein the seat is adjustably tilted downward so that the disabled or impaired user supported by the seat will be wedged between the seat and front body support with the disabled or impaired user's abdominal region in contact with the front body support;

a position stabilizing arm positioned at an elevation higher than the support lever and parallel to the support lever, the position stabilizing arm extending between the front body support post and the lateral displacement rotational means and being rotationally connected at a first position stabilizing arm end to the front body support post and rotationally connected at a second position stabilizing arm end to the lateral displacement rotational means so that the seat and front body support are maintained at a constant angle with respect to the treadmill surface as the position stabilizing arm and the support lever move rotationally about the lateral displacement rotational means and the front body support post;

an adjustable body weight support spring means rotationally connected on the lateral displacement rotational means for applying an adjustable full or partial weight-bearing supporting force to the support lever so that the seat, the front body support and the disabled or impaired user is configured to move up or down and laterally responsive to a variable force supplied by the disabled or impaired user as the disabled or impaired user walks, stands or sits over the treadmill surface in the treadmill body support system; and a control lever mounted on the adjustable body weight support spring means so that upon movement of the control lever an off-center circular disk is turned to a static mode position which releases a gas control pin to limit the movement of a pressurized gas within the adjustable body weight support spring means so that the movement of the seat and front body support is configured to be locked at variable fixed elevations including a treadmill body support sitting height position to allow the disabled or impaired user to enter or exit the treadmill body support system from a wheelchair sitting position and hold the seat, the front body support and the disabled or impaired user in a continuous treadmill body support sitting position without the application of the disabled or impaired user's body weight force or an external force and so that upon further movement of the control lever the off-center circular disk is turned to a dynamic mode position to activate the gas control pin to release the movement of the pressurized gas within the adjustable body weight support spring means so that the seat, the front body support and the disabled or impaired user are not restrained to the treadmill body support sitting height position or a treadmill body support fixed elevational position and is configured to move to a treadmill body support standing or a treadmill body support walking position on the treadmill surface with the disabled or impaired user supported by the adjustable full or partial weight-bearing supporting force applied by the adjustable body weight support spring means within the range of a full upright standing position and the treadmill body support sitting height position;

the method comprising:

adjusting the seat to a stationary sitting height position by movement of the control lever to the static mode position when the treadmill body support system is in the treadmill body support sitting height position;

positioning a disabled or impaired user occupied wheelchair behind the seat;

assistedly or non-assistedly transferring the disabled or impaired user to the seat; and moving the control lever to the dynamic mode position to allow the disabled or impaired user to rise to the treadmill body support standing or the treadmill body support walking position on the treadmill surface with a full or partial weight-bearing supporting force and to ambulate on the treadmill surface with freedom of forward, vertical and lateral body center of mass displacement.

12. The method of claim 11 further comprising moving the control lever to the static mode position when the seat is positioned between the full upright standing position and the treadmill body support sitting height position.

13. The method of claim 11 further comprising moving the control lever to the static mode position when the seat is positioned in the treadmill body support sitting height position.

14. The method of claim 13 further comprising assistedly or non-assistedly transferring the disabled or impaired user from the seat to the wheelchair behind the seat.

* * * * *